Sept. 4, 1923.
A. C. AUSTER
1,466,781
WINDSHIELD HINGE
Filed March 29, 1922
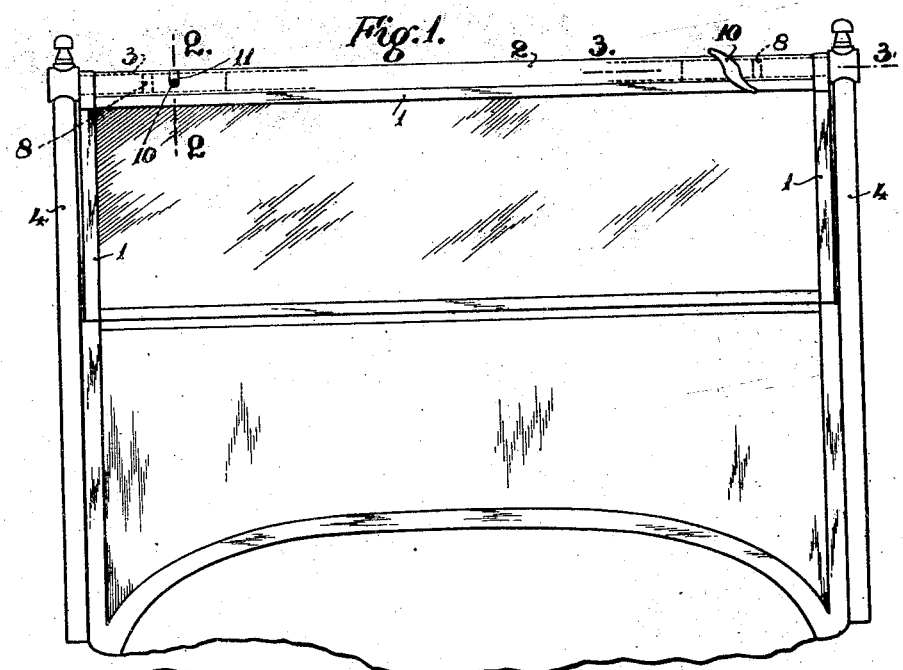
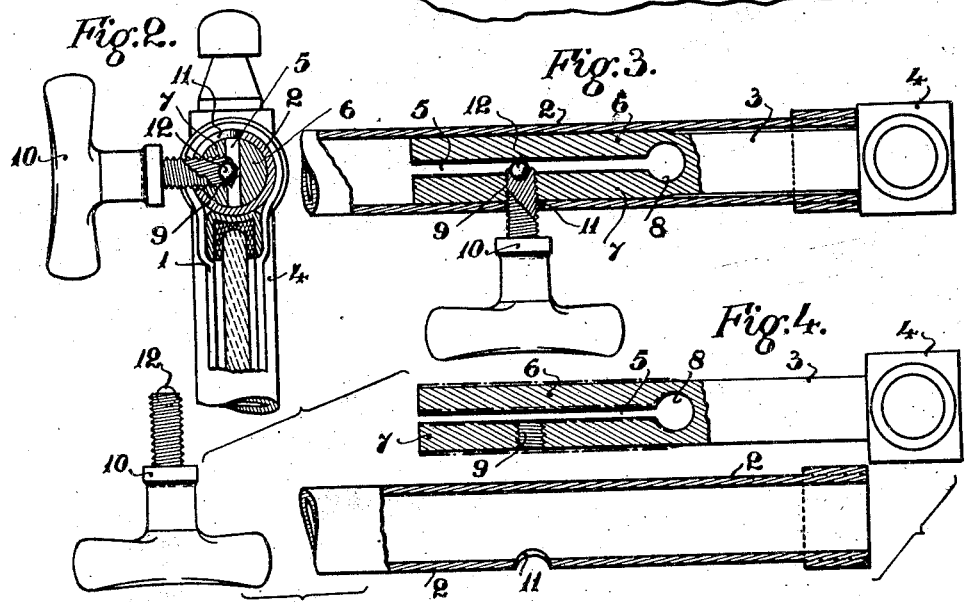
INVENTOR
ARTHUR C. AUSTER
BY
Richards Geier
ATTORNEY.

Patented Sept. 4, 1923.

1,466,781

UNITED STATES PATENT OFFICE.

ARTHUR COLLINS AUSTER, OF BIRMINGHAM, ENGLAND, ASSIGNOR TO AUSTER LIMITED, OF BIRMINGHAM, ENGLAND.

WINDSHIELD HINGE.

Application filed March 29, 1922. Serial No. 547,673.

*To all whom it may concern:*

Be it known that I, ARTHUR COLLINS AUSTER, subject of the King of Great Britain, residing at the city of Birmingham, England, have invented certain new and useful Improvements in Windshield Hinges, of which the following is a specification.

This invention relates to adjustable hinges or joints for the wind-screens of motor-cars and the like, said hinges or joints being of that type comprising an outer tube carrying the glass screen and mounted and rotatable upon a fixed inner member consisting of a rod carried by the side standards or attachment members of the screen and split or divided from its inner end said rod being adapted to be expanded into engagement with the interior of the outer tube by means of a screw passing through a tapped hole in one divided portion or branch of the inner rod so as to bear against the other divided portion or branch.

With this type of hinge, if the inner rod is merely split longitudinally from the end up to a certain point so that the slit is of the same width at the inner end as at the outer end, the two branches tend to expand with an angular movement, turning or bending from their inner ends lever fashion, thereby bearing upon the interior of the outer tube chiefly at their outer ends, where such pressure has less effect in preventing movement of the screen than if applied nearer the inner ends of the branches. Moreover, the screw by which the inner rod has been expanded has heretofore been provided with a more or less flat end, bearing with a considerable amount of friction against the one branch of the split rod, so that a proportion of the turning effort exerted by the user in tightening the joint has been utilized or absorbed in overcoming the said friction of the screw, and consequently it has not been possible to exert such an effective pressure upon the interior of the tube as would be possible were the friction of the screw upon the rod eliminated or reduced. One of the objects of the present invention is to provide means whereby the expansion of the split rod is rendered uniform over substantially the whole length of the divided portion, with the result that the area of contact is increased and a more effective locking action obtained by reason of the pressure exerted by the inner ends of the branches of the rod. A further object is to reduce to a minimum the friction between the inner end of the expansion screw and the split rod, thus admitting of substantially the full pressure which is applied to the screw, being utilized in expanding the rod into engagement with the tube.

According to the said invention, the inner end of the slit in the split rod terminates in a hole or enlargement passing transversely through the rod and considerably wider than the slit so as to reduce in width and weaken the branches of the split rod at this point, thereby enabling the said branches, when expanded, to bend or flex readily at this point and to assume a more or less cranked formation so as to lie parallel to the outer tube and bear upon the latter uniformly throughout their length. To overcome or minimize the friction between the end of the expansion screw and the face of the rear branch of the split rod, a fixed or loose steel ball is mounted in the extremity of the screw so as to bear upon the said face of the rear branch.

Figure 1 of the accompanying drawings is an elevation of a motor-car wind-screen embodying the present invention.

Figure 2 is a section on line 2—2, Figure 1, upon a larger scale.

Figure 3 represents a horizontal section on line 3—3, Figure 1, with the inner rod partly in elevation.

Figure 4 is a sectional plan showing the inner member in its normal condition by full lines and in its expanded condition by dotted lines; and also showing part of the outer tube and the screw in sectional elevation and separately from the inner rod.

Referring to the drawings the frame 1 of the glass screen is suitably secured at one edge to a transverse tube 2 forming the outer member of the hinge. This tube is mounted at each end upon an inner member 3 fixedly carried by the corresponding side standard 4 or arm, by which the screen is attached to the vehicle. This inner member 3 consists of a circular bar or rod secured to the said side standard or arm by any suitable means. The said rod is split at 5 longitudinally and in a vertical plane for a portion of its length from its free end to form two halfround branches 6, 7, and in accordance with this invention the inner end of the slit 5 terminates in a vertical hole or enlargement 8 of circular or other shape, and of a diameter preferably at least equal to one half of the full diameter of the rod. By this means the width of the two branches 6, 7, are considerably weakened at the inner end of the slit. The branch 7 is provided with an interiorly screw-threaded hole 9 which receives a screw-pin 10 (having a winged head) passing through a slot 11 in the outer tube, so that when screwed up the end of this pin bears against the other branch 6 and forces the two branches apart into frictional engagement with the interior of the outer tube 2, as shown in Figure 3, thus frictionally locking the screen in position. To reduce the friction between the end of the screw 10 and the face of the branch 6 which it engages, a steel ball 12 is let into a recess in the extremity of the screw and is retained therein by partially closing the mouth of the recess. Preferably this ball is so mounted as to be free to rotate, although it has been found that the friction is much reduced if the ball is fixed in position, as a point contact is then obtained.

When the screw 10 is tightened up the branches 6, 7, of the split rod 3 are expanded from the inner end of the slit so that the pressure is first applied to the tube 2 by their outer ends, but as the screw is tightened up further, they tend to be distorted adjacent the hole or enlargement and assume a more or less cranked form at this point, as shown in Figure 3 and by dotted lines in Figure 4, and exert pressure upon the outer tube uniformly throughout their whole length.

By the combined use of a steel ball in the end of the expansion screw and the hole or enlargement at the end of the slit, practically the whole of the turning effect exerted on the screw is utilized in uniformly expanding the split portion of the inner rod into engagement with the outer tube, and thus a very secure locking effect is obtained.

Having fully described my invention, what I desire to claim and secure by Letters Patent is:—

An adjustable hinge for wind-screens of motor-cars and the like comprising an outer rotatable tube; a split rod engaging the interior of the tube, said rod being rigidly fixed at its outer end and having a longitudinal slit extending from its inner free end to form a pair of branches, said slit terminating in an enlargement which weakens the branches of the rod at this point; and a screw passing through an internally screw-threaded hole in one branch of the split inner rod, at a point between the inner free end of the rod and the enlargement of the slit, whereby the initial tightening of said screw will cause the inner end of said branches to be forced into contact with said tube to form fulcrums about which further tightening of said screw will force said branches to be distorted and thereby force the entire outer surfaces of said branches into tight frictional engagement with said tube.

In testimony whereof I have hereunto set my hand in presence of two subscribing witnesses.

ARTHUR COLLINS AUSTER.

Witnesses:
W. N. SKERRETT,
W. S. SKERRETT.